J. R. NICHOLS.
DEVICE FOR LOCKING MOTOR VEHICLES.
APPLICATION FILED JAN. 17, 1918.
1,267,687.
Patented May 28, 1918.
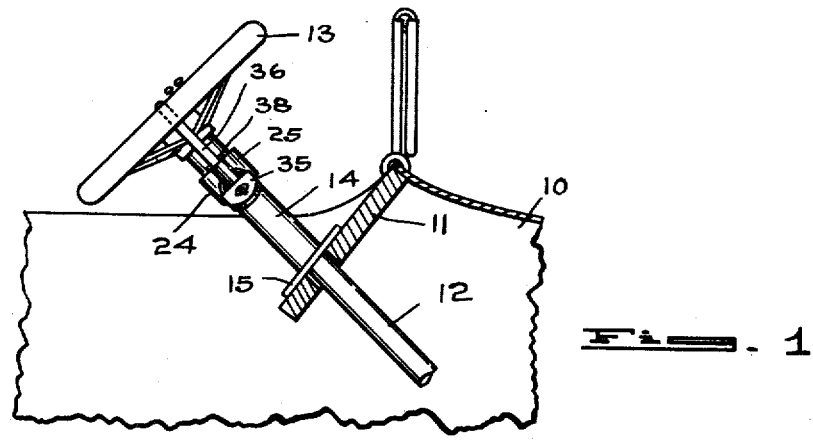
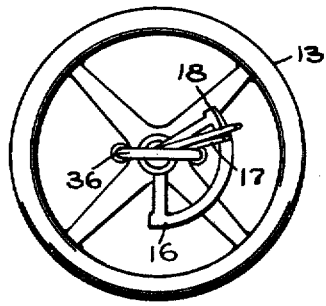
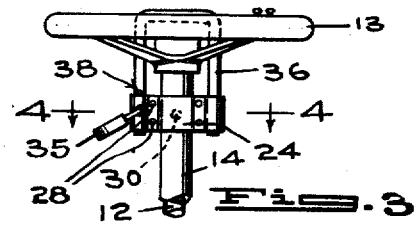
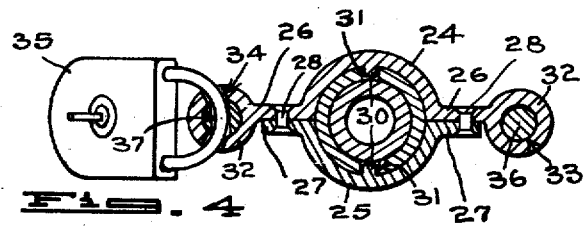
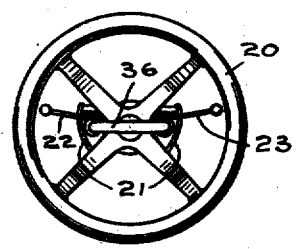
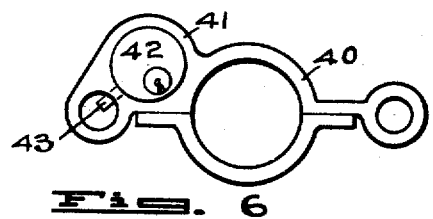
INVENTOR
JOSEPH R. NICHOLS
BY
C. D. Haskins
ATTORNEY

UNITED STATES PATENT OFFICE.

JOSEPH R. NICHOLS, OF SEATTLE, WASHINGTON.

DEVICE FOR LOCKING MOTOR-VEHICLES.

1,267,687.  Specification of Letters Patent.  Patented May 28, 1918.

Application filed January 17, 1918. Serial No. 212,362.

*To all whom it may concern:*

Be it known that I, JOSEPH R. NICHOLS, citizen of the United States, residing at Seattle, in the county of King and State of Washington, have invented a certain new and useful Improvement in Devices for Locking Motor-Vehicles, of which the following is a specification.

My invention relates to improvements in devices for locking motor vehicles to prevent them from being stolen and the object of my invention is to provide a locking device of a strong and simple form of construction that may readily be installed on the steering post of an automobile of the type now in common use and that may be operated to lock the steering wheel and also the fuel and spark control levers of the automobile thereby making it impossible to guide the automobile or to supply the necessary fuel and spark for starting the engine.

A further object of my invention is to provide a locking device which shall be neat in appearance, not in the way of the driver and that can be installed on any ordinary type of motor car without any alterations to the steering post and with very slight alterations to the steering post housing.

My invention consists in the novel construction of a locking device and in the adaptation and combination of such device with the steering apparatus of a motor vehicle as will be more clearly hereinafter described and claimed.

In the accompanying drawings Figure 1 is a fragmentary view partly in vertical section and partly in elevation of the front end of a motor car including a steering wheel and steering column upon which a locking device constructed in accordance with my invention is installed;

Fig. 2 is a plan view of the steering wheel;

Fig. 3 is a view in elevation of the same at right angles to the view shown in Fig. 1;

Fig. 4 is an enlarged view in cross-section substantially on broken line 4, 4 of Fig. 3;

Fig. 5 is a plan view showing the locking device applied to a steering wheel of a different type from that shown in Fig. 2; and Fig. 6 is a plan view illustrating an alternative form of lock.

Referring to the drawings throughout which like reference numerals indicate like parts, the numeral 10 designates the front end of an automobile that is provided with a cowl board 11, a steering post 12, a steering wheel 13 and a fixed steering post housing 14 all of well known standard form of construction.

The steering post housing may terminate at the cowl board and be fixedly secured thereto by means of a flanged end portion 15.

In Figs. 1, 2 and 3 I have illustrated a steering wheel 13 of well known type that is provided on its top side with a quadrant 16 and with spark and fuel control levers 17 and 18 respectively.

In Fig. 5 I have illustrated another well known type of steering wheel 20 whereon the quadrant 21 and the spark and fuel control levers 22 and 23, respectively, are mounted below the steering wheel 20 and the levers 22 and 23 project in substantially opposite directions when in an inoperative or shut off position.

My locking apparatus is equally well adapted for use with either type of steering wheel apparatus above described.

The locking apparatus proper comprises a collar made up of the two parts 24 and 25 that may be placed around the housing 14 and are provided with oppositely disposed outwardly directed arms 26 and 27, respectively, that are secured together by rivets 28.

The rivets 28 will necessarily be countersunk so that they can not easily be removed by persons that are seeking to steal the car.

The collar portions 24 and 25 are each provided with inwardly directed lugs or pins 30 that are formed integral therewith or rigidly secured thereto and are adapted to project into holes 31 in the housing 14 to prevent the collar from turning on the housing.

The arms 26 terminate in enlarged portions 32 that are each provided with perforations 33 that extend substantially parallel with the housing 14.

One of the enlarged portions 32 is provided with a transverse slot 34 that is adapted for the reception of a padlock 35.

36 is a U-shaped locking member of suitable dimensions to fit over the hub portion of the steering wheel 13 when in an inverted position, and adapted to have its ends projected into the perforations 33 in the ends of the arms 26.

One end of the U-shaped locking member is provided with a slot 37 that is adapted to register with the slot 34 so that when the padlock 35 is engaged therewith the U- shaped locking member will be securely locked to the fixed collar on the steering post.

One end of the locking member 36 is provided with a transverse pin 38 that engages with the top side of the arms 26 and 27 and serves to stop the locking member in such a position with respect to the arms 26 and 27 that the slots 34 and 37 will register thereby facilitating the engagement of the padlock 35.

Fig. 6 illustrates a collar of substantially the same form as hereinbefore described except that one of its parts 40 that corresponds with the part 26 shown in Fig. 4 which collar is enlarged as at 41 and recessed for the reception of a lock 42, said lock 42 being provided with a pin or bolt 43 that is adapted to be projected into a hole or recess of a form hereinbefore described to engage with the lower end of a U-shaped locking member and hold the same in a fixed position.

When in use the U-shaped locking member 36 may be placed over the hub portion of the steering wheel in an inverted position and securely locked to the collar on the fixed steering post housing thereby locking the steering wheel so that the car can not be guided.

The locking member 36 may also serve to lock the levers that control the spark and fuel when such levers are in their inoperative or shut off position as shown in Figs. 2 and 5 and thereby prevent the engine from being started.

It is obvious that changes in the form of construction of the various parts of this locking device may be reverted to within the scope of the appended claims.

What I claim is:

1. A locking device for the steering apparatus of a motor vehicle comprising a two part collar adapted to be secured to a fixed steering post housing, oppositely disposed outwardly projecting arms on said collar said arms having perforations in their outer ends and one of said perforated portions having a transverse slot, a U-shaped locking member adapted to straddle the hub portion and fit between the spokes of a steering wheel the ends of said locking member being adapted to project within the perforations in said arms and one of said ends having a transverse slot that registers with the slot in the perforated portion of said arm and locking means engageable within the said slots to lock the U-shaped member to the collar.

2. In a locking device of the class described, the combination with a steering apparatus including a steering wheel with its associated spark and fuel control levers and steering post that is mounted in a fixed housing, of a two part collar secured on the said housing, stud pins connecting said collar and said housing to prevent the collar from being turned on the housing, arms projecting outwardly from opposite sides of the collar said arms each having perforations in their outer extremities that extend parallel with said housing and one of said arms having a transverse slot through its perforated portion for the reception of a lock; a U-shaped locking member adapted to project downwardly over the hub of the steering wheel and between the spokes thereof in a position to intercept and prevent movement of said spark and fuel control levers when said levers are in an inoperative position, the lower ends of said locking member being adapted to project through the perforations in the extremities of said arms and one of said ends having a transverse slot that registers with the slot in the perforated portion of one of said arms for the reception of a lock; and a stop on said locking member to engage with the top side of one of said arms.

In witness whereof, I hereunto subscribe my name this 5th day of January, A. D. 1918.

JOSEPH R. NICHOLS.